United States Patent [19]
Tanie

[11] 3,822,857
[45] July 9, 1974

[54] SYNTHETIC RESIN PLUG FOR VENT HOLE OF MOULD

[75] Inventor: Hiroshi Tanie, Osaka, Japan

[73] Assignee: The Toyo Rubber Industry Co., Ltd., Osaka, Japan

[22] Filed: Feb. 14, 1972

[21] Appl. No.: 225,717

[30] Foreign Application Priority Data
Feb. 16, 1971 Japan.................................. 46-7281

[52] U.S. Cl.................. 249/141, 164/410, 425/812
[51] Int. Cl............................................. B29c 1/00
[58] Field of Search........... 249/141, 134, 127, 113; 425/DIG. 812; 164/410

[56] References Cited
UNITED STATES PATENTS
| | | | |
|---|---|---|---|
| 1,552,245 | 9/1925 | Thompson | 249/141 X |
| 2,294,935 | 9/1942 | Ritchie | 249/141 X |
| 2,987,819 | 6/1961 | Miller et al. | 425/812 |
| 3,160,928 | 12/1964 | Smillie | 425/812 |
| 3,266,099 | 8/1966 | Bucy | 249/141 |

FOREIGN PATENTS OR APPLICATIONS
218,991    1/1958    Australia............................ 249/141

Primary Examiner—Richard B. Lazarus
Attorney, Agent, or Firm—Wenderoth, Lind & Ponack

[57] ABSTRACT

In a mould for moulding an elastic polymer material and having a plurality of vent holes, a synthetic resin plug for said vent hole which comprises one or plural micro-holes perforated therethrough of round cross-section having a diameter in a range of 0.05 to 0.5 mm and inlayed on the inner side of the mould, whereby air is readily exhausted through the said micro-holes of the resin plug with no choking phenomenon by the said polymer material. The said plug is provided over substantially whole the inner side of the mould or is provided only in the portion of each vent hole on the inner side of the mould. The synthetic resin is a heat-resistant and non-adherent material such as a fluoric resin.

2 Claims, 3 Drawing Figures

SYNTHETIC RESIN PLUG FOR VENT HOLE OF MOULD

BACKGROUND OF THE INVENTION

This invention relates to a mould for moulding elastic high polymer materials such as natural rubbers, synthetic rubbers and the like (hereinafter referred to as rubber-like materials) therein with heat and pressure, and more particularly to a synthetic resin plug therefor for exhausting air confined and remaining in a space between the rubber-like material and the mould face during the moulding process.

In a general moulding process of heating and curing a rubber-like material in a mould, the rubber-like material commences to increase its plasticity as it is pressed and heated in the mould space, gradually flows along the faces of the mould and fills up completely whole the cavity of the mould, thereby producing a moulded article of the mould cavity shape. When that a mould having complicated shapes or uneven (concavo-convex) faces is employed, an air pocket (air void) is liable to be formed on a face of the mould encompassed with the rubber-like material at the initial stage of moulding under heat and pressure, i.e., flowing stage of the rubber-like material and hardening proceeds under the condition that the portion of the air pocket is not filled along the face of the mould with the said material, which leads to the production of inferior goods having pitted faces.

Many attempts have been heretofore made in order to avoid the production of inferior goods as described above and there are provided various methods contriving some means or devices at the vent hole portion of a mould where the air pocket is liable to be formed as follows:

a. a method in which small holes of ca. 1 to 2 mm in diameter called vent holes are provided from inside to outside the mould body, through which the holes the air confined is exhausted outside the mould;

b. a method in which the inner mould side of the vent hole is enlarged in a stair form and into the enlarged part is inserted a hollow sleeve which is filled tightly with a bundle of fine linear materials in a range of 0.2 to 0.6 mm in diameter whereby a group of micro-interstices is formed between the mutual fine materials and the inner wall of the sleeve and the fine materials;

c. a method in which a cylinder formed of core plugs of column-shaped pieces, the outer surfaces of which are notched into concavo-convex shapes axially, is inserted in the said enlarged part of the vent hole whereby a group of micro-interstices of triangle shape is formed between the cylinder and the core plugs; and d. a method in which a porous material made of a ferrous group is inserted in the vent holes.

However, the above typical prior methods have the following various drawbacks and problems to be solved.

At first, according to method (a), since the hole diameter is fairly large and a plurality of vent holes are required, the rubber-like material penetrates readily into every nook and corner of the mould and adheres closely to the mould face. Accordingly, when a vulcanized product formed after heating and moulding is released from the mould, the rubber pieces in the portion of the vent holes are pulled up in various directions such as the vertical direction, shearing direction and the consequence thereof is that a part of the rubber pieces is often torn off and the torn-off rubber remains inside the vent holes, thus sealing the holes. Further, the rubber pieces corresponding to the vent holes of the completed product are of relatively thick and long shapes and hence are required to be eliminated from the product in a subsequent finishing operation.

According to method (b), since the plug is comprised of assembled linear materials, fine particles or rubber-like materials collect and remain in that portion of the plug because of the great flow resistance of the rubber-like material at the initial stage of the moulding process when the said material begins to flow with the result that the portion is prone to be choked up and air is hindered from being vented from the portion, and hence many fine holes are required to be provided. Furthermore, each the micro-interstice has a shape that is formed by linking three contact points among the linear materials or among the linear materials and the hole and three circular arcs made thereby, and after moulding the rubber-like material which penetrated through the micro-interstices is susceptible to tearing-off when released from the mould. Consequently, choking of the holes is thus caused.

Further, according to method (c), a material made of a metal is used and a group of triangular micro-interstices is formed continuously, and the appearance of the completed product is not good.

Finally, according to method (d), the porous material made by sintering iron is used and hence choking is most prone to occur.

In view of the defects of the known methods as described above, it will be seen that it is an essential prerequisite that in a mould for moulding a rubber-like material, the choking phenomenon occurs neither at the initial flowing stage of the said material before filling up the mould, nor after heating and moulding occurs. For that reason, a releasing agent or a releasable powder such as talc is, in general, coated on the face of a mould or a rubbe-like material. However, there is a great tendency that the releasing agent is removed when the rubber-like material commences to flow, while the releasable powder is mingled into the rubber-like material, and hence in both cases, satisfactory air exhaustion or ventilation effect cannot be expected between the rubber-like material and the mould face. In consequence thereof, a mould having a great number of vent holes is required and is practically used at present.

SUMMARY OF THE INVENTION

In order to solve the problems and obstacles encountered hitherto, it is necessary that in obviating adherence of a rubber-like material to a mould at the initial moulding stage, flowing resistance of the mould be reduced to the utmost and that after moulding the rubber-like material which penetrates into micro-holes of a portion of vent holes be released readily from the mould without being torn off.

Accordingly, the present invention has an important object to solve the foregoing problems, in other words, to meet the foregoing necessity.

Namely, it is an object of the invention to provide a synthetic resin plug for a mould for moulding a rubber-like material with which air exhaustion is readily performed.

It is another object of the invention to provide a synthetic resin plug for a mould with which there is no choking phenomenon of rubber-like material to be moulded in the mould during moulding and after moulding, and the moulded product may be readily released from the mould with no tearing-off thereof.

The feature of the invention for attaining the above objects consists in the use of a different kind of material than metals used heretofore, i.e., a specified kind of synthetic resin as a mould plug.

The another feature of the invention is in a mould plug which is perforated with one micro-hole or a small number of micro-holes having a specified range of diameter.

In accordance with the invention, there is provided a synthetic resin plug for vent holes of a mould for moulding a rubber-like material therein which is formed by inlaying a low friction coefficient, heat-resistant and non-adherent synthetic resin such as a fluoric resin, for example, tetra-fluoroethylene resin, tetrafluoroethylene-hexafluoropropylene co-polymer resin, trifluorochloroethylene resin and the like in a required place of the mould and forming one or a plurality of micro-holes of round cross-section having a diameter in a range of 0.05 to 0.5 mm through the said inlayed resin. Being made of a synthetic resin of the class as specified above, the resin plug according to the invention has no adherence to a rubber-like material to be moulded and exceedingly low flowing resistance to the rubber-like material, so that air exhaustion or ventilation of the rubber-like material through the resin plug is improved and good. As a result, the number of the micro-holes in the plug may be greatly reduced as compared to prior plugs.

It should be noted that the conventional plugs made of metals having micro-holes therein have a greater resistance to flowing of a rubber-like material than the mould faces as well as adherence to the said rubber-like material, whereas with the resin plug of this invention, air exhaustion or ventilation is facilitated without any tendency toward choking up the micro-holes portion of the plug with the rubber-like material because the rubber-like material can flow more readily over the plug portion than the metal face of the mould and air in the contact faces between the mould and the resin plug is thus readily circulated and exhausted and besides, after moulding a piece of the rubber-like material which penetrates partly into the resin plug may be exceedingly readily released. Such being the case, there are many advantages, such as that choking at the initial stage of and after completion of the moulding is never seen, the resin plug may be used during a remarkably long period of time as compared with the conventional metal plugs which have been exclusively utilized, and a much fewer number of vent holes will do as compared with conventional metal plugs. The synthetic resin plug according to this invention thus contributes greatly to the field of moulding of elastic polymer materials. Moreover, after completion of moulding, the penetration degree of the rubber-like material into the micro-holes of the plug is also less as compared with the case of metal plugs, appreciable projections on a completed product are not formed and hence, subsequent finishing operations on the completed product may be omitted.

In the production of the plug of this invention, particularly at the step when the synthetic resin plug is inlayed in the mould, it is possible to carry out easily grinding and finishing operations as compared with the case of the metal plugs, so that a synthetic resin plug for a mould having a complicated shape may also be readily produced.

BRIEF DESCRIPTION OF THE DRAWINGS

This invention will be described hereinbelow with regard to certain preferred embodiments with reference to the accompanying drawings in which.

DETAILED DESCRIPTION OF THE INVENTION

Figure 1:
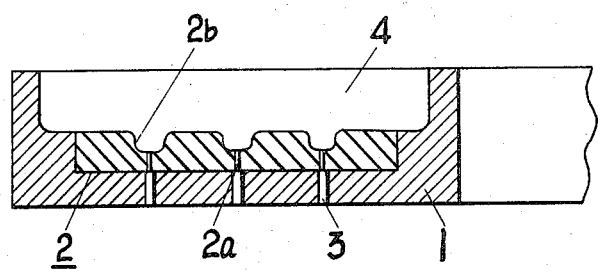
FIG. 1 is a view in longitudinal cross-section of a ring-formed mould showing one embodiment of this invention.

In the drawings above, however, the simple ring-formed moulds as illustrated shall be referred to only for exemplification in order that the invention may be readily understood, though most of the moulds requiring vent holes actually used are constructed of a more complex shape.

In FIG. 1, a mould is shown which is for a product having three projections on its one surface. The mould 1 is replaced partly with a synthetic resin plug 2 of a ring form in the part corresponding to the projections of the product and the resin plug 2 has a concave part 2b having a shape corresponding to the projections of the product, on the bottom of which concave part 2b there are provided at random micro-holes 2a which are interconnected with corresponding vent holes 3 of the mould. In the moulding process of a rubber-like material by the use of the mould 1 of the shape as shown in FIG. 1, the rubber-like material is poured into a mould cavity 4, a lid mould is then fitted on the mould body from above and the mould system is subjected to heat and pressure. Here, since the bottom of the mould 1 is almost wholly constructed of the synthetic resin plug 2 even though the mould has a complex design, the rubber-like material flows along the surface of the resin plug with no adherence to it while maintaining good air-permeability between the material and the resin plug, with the result that no choking phenomenon occurs and air exhaustion or ventiliation is smoothly performed. Thus, the plug can vent the air completely with only a small number of micro-holes. Further, the penetration of the solid rubber-like material into the micro-holes is substantially avoided and after completion of the moulding process the rubber-like material is readily released from the mould, without being torn off even if there is some penetrated rubber-like material. Accordingly, the product thus obtained has a good appearance. The resin plug may be efficiently used over a long period of time with no choking of the vent holes. This embodiment shows an example in which the plug constitutes a part of the mould, but it is, of course, possible to provide a plug only in the portion of concave part of the mould in a ring form or in a part thereof.

Figure 2:
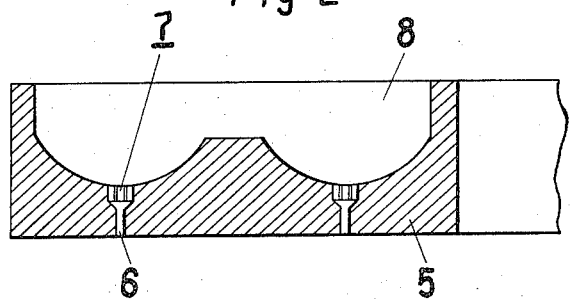
FIG. 2 is a view in sectional elevation showing another example of a ring-formed mould according to the invention.
Figure 3:
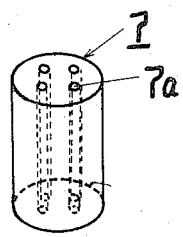
FIG. 3 is an enlarged perspective view of a resin plug in FIG. 2.

FIG. 2 shows another example of a mould in which the inner side, i.e., the cavity 8 side of vent holes 6 in a mould 5 are enlarged and in those enlarged portions resin plugs 7 are inserted. As shown in FIG. 3, the synthetic resin plug 7 is shaped in a column form having four micro-holes 7a therethrough and is to be inserted in the enlarged portion of each the vent holes 6 in the mould 5. For example, a mould is constructed so that the enlarged portion of the vent hole has a size of 4 mm in diameter by 6 mm in depth, the resin plug has a diameter of 4.2 mm and the micro-hole has a diameter of 0.4 mm. Also by the use of a mould having the shape above in a moulding process of a rubber-like material, the said material can flow smoothly on the faces of the micro-holes 7a of the resin plugs 7 with no adherence to the plugs as is the case of the aforesaid example in FIG. 1. Namely, no choking phenomenon is seen at all, air is extremely readily vented out of the vent holes and the number of resin plugs and the micro-holes may be greatly reduced as compared with the case of the metal plugs. In connection with the number of the micro-holes, it was found that in the above example of sizes even when the total cross-sectional area of micro-holes through the one resin plug 7 is equal to the area of one micro-hole having a diameter of 0.3 mm to 0.25 mm, sufficiently satisfactory results are attained. This area corresponds to the area of four micro-holes having each ca. 0.15 mm in diameter. An exception is the case of especially large sized rubber articles such as construction tires, where the area of each micro-hole may be slightly increased, as the case may require. In the prior art methods, plugs provided with an assembly of a great number of micro-holes have been employed because of the necessity of great area of air exhaustion per one vent hole whereas according to this invention by the use of the subject resin plug, sufficiently good results were obtained with less than 1/10 the said area required for the prior art air exhaustion, even if the mould shape is complex so that it is difficult to vent air. Further, after the moulding process the rubber-like material which has penetrated slightly into the vent holes can be readily released from the mould without tearing-off. There occurs no choking phenomenon in the mould and hence, the mould may be advantageously and efficiently used.

It is to be understood that the above discloses a preferred embodiment of the invention and that various other modifications or variations may be made without departing from the socpe and spirit of the invention as set forth in the following claims.

What is claimed is:

1. In combination, a mould for moulding an elastic polymer material, the inner side of the mould having a recess and said mould having a plurality of vent holes opening into said recess and a synthetic resin plug for said vent holes having opposite end surfaces and at least one micro-hole therethrough between said end surfaces, there being at least one micro-hole for each vent hole which micro-hole is round in cross-section throughout its length and has a diameter in the range of 0.05 to 0.5 mm, said plug being inlaid in said recess with said micro-holes in communication with said vent holes and with the end surface of said plug which is toward said mould constituting part of the inner mould surface, said synthetic resin being a low friction coefficient, heat-resistant material which is non-adherent to the elastic polymer material.

2. In combination, a mould for moulding an elastic polymer material and having a plurality of vent holes and a plurality of recesses in the interior surface of said mould into which said vent holes open, and a synthetic resin plug for each of said vent holes having opposite end surfaces and having at least one micro-hole therethrough between said end surfaces and which is round in cross-section throughout its length and has a diameter in the range of 0.05 to 0.5 mm, said plugs being in said recesses with said micro-hole in communication with the vent holes and with the end surface of said plug which is toward said mould constituting part of the inner mould surface, said synthetic resin being a low friction coefficient, heat-resistant material which is non-adherent to the elastic polymer material.

* * * * *